2,478,286

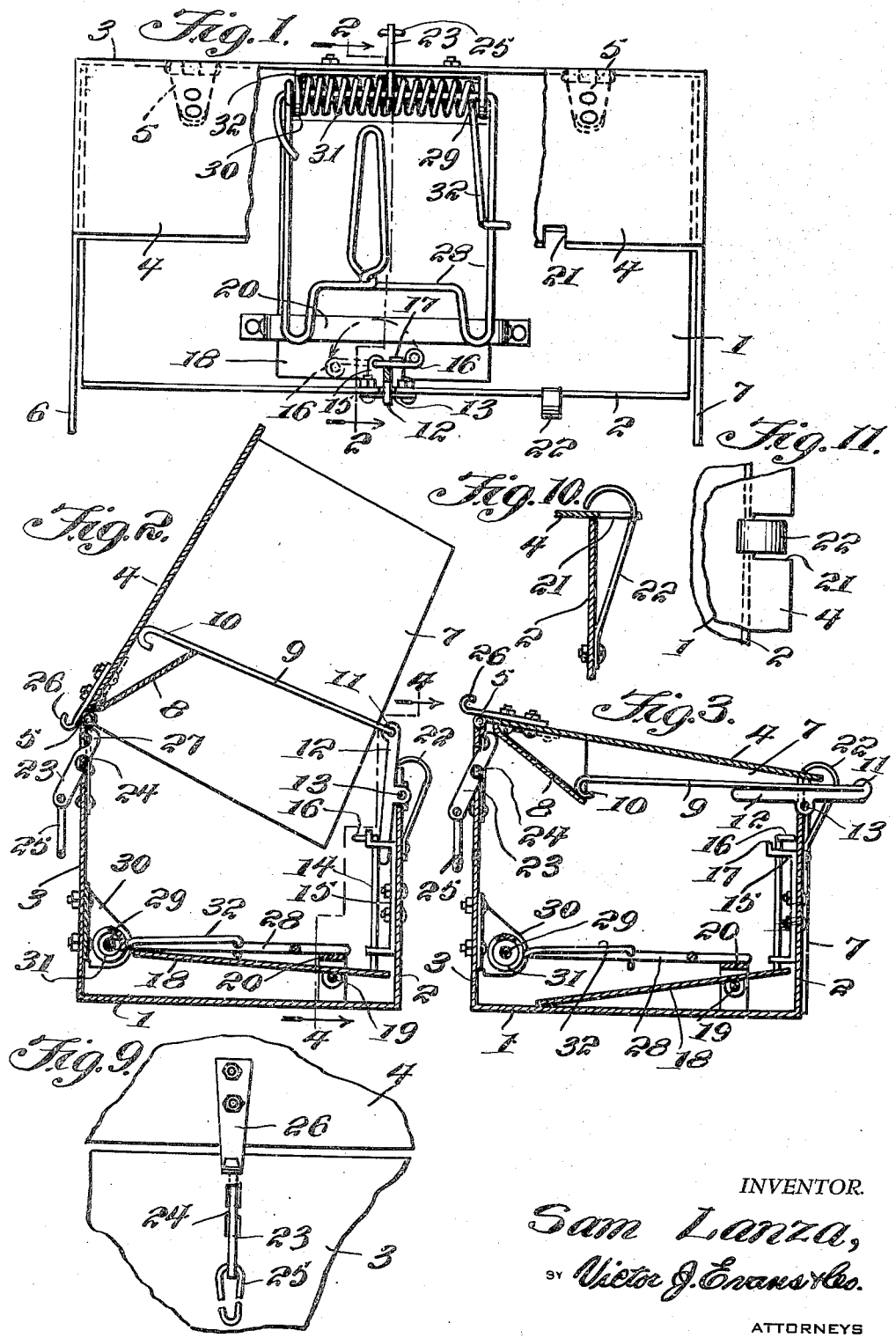
Aug. 9, 1949.     S. LANZA     2,478,286
ANIMAL TRAP
Filed June 2, 1947     2 Sheets-Sheet 1
INVENTOR.
Sam Lanza,
BY Victor J. Evans & Co.
ATTORNEYS Aug. 9, 1949.  S. LANZA  2,478,286
ANIMAL TRAP
Filed June 2, 1947  2 Sheets-Sheet 2
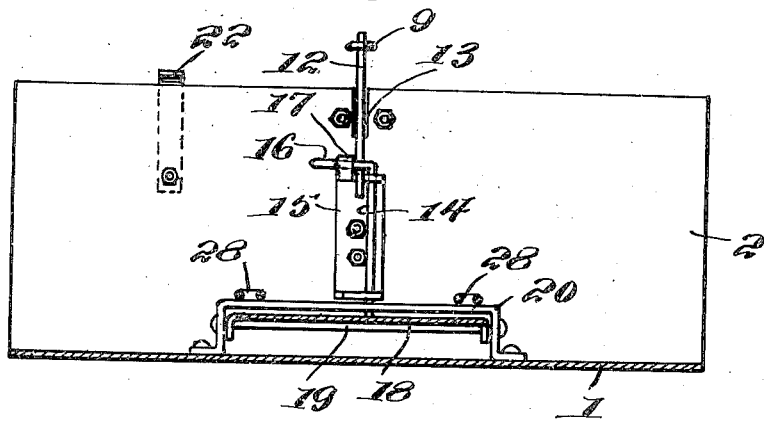
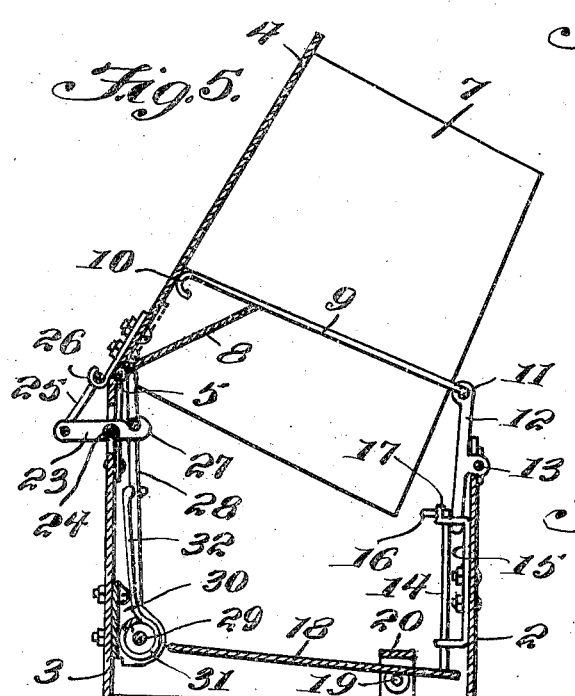
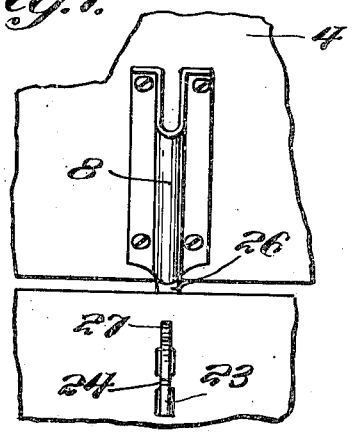
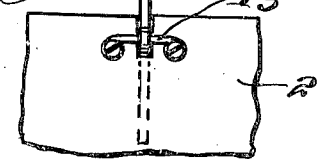
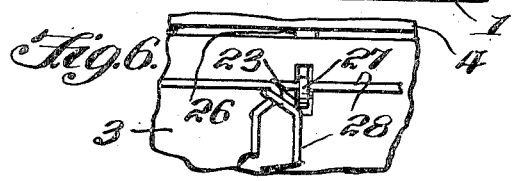
INVENTOR.
Sam Lanza,
BY Victor J. Evans & Co.
ATTORNEYS Patented Aug. 9, 1949

UNITED STATES PATENT OFFICE 2,478,286

ANIMAL TRAP

Sam Lanza, Lorain, Ohio

Application June 2, 1947, Serial No. 751,839

7 Claims. (Cl. 43—62)

The present invention relates to an improved animal trap that is designed for selective use in imprisoning or trapping an animal alive without injury, or for striking the imprisoned animal, and means are provided and actuated by the weight of the animal on a tiltable platform for the single operation of trapping the live victim; as well as for the joint operation of imprisoning, and smiting by a hinged jaw, the victim as it steps upon the tiltable platform.

For trapping the animal alive I provide the trap with a hinged and swinging closure that is supported in open position by releasable mechanism, and which when released falls or swings downwardly for co-action with the trap or housing to imprison the victim; and this trapping or imprisoning mechanism is jointly operated with the smiting mechanism for killing the victim.

The trap is designed for use in imprisoning animals of various sizes. and it may be placed in desired locations, with oppositely open ends for entrance of a victim, and with or without the use of a bait on the tiltable platform that is released by the victim to spring or actuate the operating mechanisms after the trap has been set.

The invention consists in certain novel features of construction and combinations and arrangements of parts as will hereinafter be described, and more specifically set forth in the appended claims.

In the accompanying drawings I have illustrated a complete example of the combination or selective trap in which my invention is embodied and in which the parts are combined and arranged in accord with one mode I have devised for the practical application of the principles of my invention. It will however, be understood that changes and alterations are contemplated and may be made in these exemplifying drawings and mechanical structures within the scope of my claims without departing from the principles of the invention.

Figure 1 is a top plan view of a trap embodying my invention, in set position, with a portion of the closure lid broken away for convenience of illustration.

Figure 2 is a transverse vertical sectional view at line 2—2 of Fig. 1, showing the trap set for imprisoning the victim alive.

Figure 3 is a view similar to Fig. 2, but showing the closure in closed position for imprisoning the live victim.

Figure 4 is a vertical longitudinal sectional view of the open end trap and tiltable platform, as at line 4—4 of Fig. 2.

Figure 5 is a transverse vertical sectional view of the trap and closure with its jointly operating parts set for imprisoning and smiting the victim.

Figure 6 is a detail view of the catch for the spring-actuated jaw for striking the victim.

Figure 7 is an enlarged detail fragmentary view of portions of the closure-lid and trap showing a slotted bracket for use with the closure-brace.

Figure 8 is a fragmentary view of the front wall of the trap showing the trigger lever and brace rod for the closure.

Figure 9 is a fragmentary view of the closure and the back wall of the trap showing the trigger mechanism for the spring-actuated striking jaw.

Figure 10 is a sectional detail view of the lock for the closure; and

Figure 11 is a top plan view of the lock in Fig. 10.

In carrying out my invention I utilize a box or trap having open ends for entrance of the victim, which consists of a bottom or base plate 1, a front upright wall 2, and a higher back wall 3, which as here shown may be of metal or other suitable material.

The trap is provided with a closure that is overbalanced in set position so that it will swing or fall under its own weight to closed position when its supporting brace is released, and it includes a top or lid 4 extending the full length of the trap, and hinged at 5 on the upper edge of the taller back wall 2. The closure is fashioned with end flanges 6 and 7 disposed in vertical planes that are adapted to close the open ends of the trap and thus imprison the victim.

For use in setting the trap with the closure in uplifted position as shown in the drawings, a hollow guide bracket 8 is mounted upon the inner face of the lid 4 of the closure adjacent its hinged edge, and a transversely arranged brace-rod 9 having a hooked and rounded free end 10, co-acts with a sliding fit in the groove of the bracket. The front end of the brace-rod is pivotally mounted at 11 upon a hinged latch arm 12 pivoted at 13 on the upper edge of the front wall 2 of the trap, and in the upright set position of the latch in Figs. 2 and 5, its free end projects downwardly within the trap where it is retained by a vertically disposed trigger 14. The trigger is vertically reciprocable and partially rotatable and it is mounted in perforated end-ears of an upright bracket 15 that is fastened on the inner side of the front wall of the trap.

The upper end of the vertically disposed trigger is fashioned with a horizontal arm or catch 16 that engages behind a retaining lug 17 of the bracket while the trigger is in lower set position, and the trigger is lifted out of engagement with this lug by means of the tilting movement or lever-action of a tiltable platform 18 when the latter is actuated by the weight of the victim as it steps upon the platform.

The flat platform 18 is pivoted at 19 in, and under a bracket frame or bridge 20 having its ends fastened to the bottom of the trap, and the pivot is arranged near the front edge of the platform to provide a short lever-movement of the front edge to lift the trigger 14 if and when the victim enters either end of the trap and steps upon the platform to depress its major portion.

As the trigger is lifted out of engagement with the lug 17, the weight of the overbalanced closure, transmitted through brace 9 to the upright lever 12, swings the lever on its pivot to horizontal position, and the free end of the lever, in contact with the arm 16 partially rotates the trigger out of its path, as indicated by dotted lines in Fig. 1, thereby releasing the closure and permitting it to fall to closed position.

As seen in Figs. 1, 10 and 11, the front edge of the lid 4 of the closure is provided with a notch or open slot 21 which is adapted to straddle a spring locking blade or hook 22 attached at its lower end to the front face of the front wall of the trap, and this hook snaps over the edge of the closure to lock it to the trap.

The mechanism thus described is adapted to imprison a live victim; and it is adapted to coact with smiting mechanism for both imprisoning and stunning the victim as it steps upon and depresses the platform 18, which may, or may not be provided with a bait.

For imprisoning and simultaneously smiting or striking the victim a second trigger mechanism is shown in use in Fig. 5, where a trigger 23 is pivoted at 24 in the rear slotted wall 3 of the trap, and this trigger is provided at one end with a ring or loose link 25 that is adapted to engage over and retain a hook 26 that is attached on the outer face of the closure-lid 4 near its hinged edge. The opposite end of the trigger, within the trap is fashioned with a hook 27 that engages a wire jaw or striking frame 28 of rectangular formation, and which is pivotally mounted at 29 in a bracket 30 attached to the inner face of the back wall 3, near the bottom of the trap.

For actuating the striking frame or swinging jaw when it is released a spring 31 of the torsion type is mounted on the pivotal axis 29, and provided with two spaced arms 32, 32 engaging the frame or jaw, and the spring swings the jaw downwardly and inwardly from its upright position into contact with the bridge-bracket 20, above the tilted platform as indicated in Figs. 2 and 4.

When an animal steps on the platform 18 the short end forces a trigger 14 upward to release the arm 16 which is snapped around, as indicated by the dotted lines shown in Figure 1, whereby the arm 12 is actuated to release the brace rod 9. The lid 4 then drops downwardly by gravity with the hook 26 pulling the trigger 23 through the link 25 whereby the frame 28 is released from the hook 27 of the trigger, whereupon the spring swings the jaws down to strike the victim.

Having thus fully described my invention, what I claim as new and desire to secure by Letters Patent is:

1. In an animal trapping appliance, the combination with an oblong trap having open ends, a bottom, a front wall and a back wall, a closure for the trap hinged on its back wall, and a tiltable platform mounted on the bottom, of a brace-rod engaging the closure to uphold it in set position, a lever-arm pivoted on the front wall and pivoted to the brace-rod, and trigger mechanism interposed between the tiltable platform and the lever-arm for releasing the closure.

2. In an animal trapping appliance, the combination with a trap having a bottom, front and rear walls, and open ends, a closure having a lid and end flanges hinged on the back wall, and a tiltable platform mounted on the bottom, of a brace rod operatively engaging the uplifted closure in set position, a lever-arm pivoted on the front wall and pivoted to the brace rod, a vertically reciprocable trigger mounted on the front wall and resting on the platform, and releasable means connecting the trigger and lever-arm.

3. In an animal imprisoning appliance, the combination with an open end trap having a bottom, front wall and back wall, a closure having a lid and end flanges and hinged in overbalanced position on the back wall, and a tiltable platform mounted on the bottom, of a bracket forming a slotted-guide mounted at the hinged edge of the closure, a brace rod engaging the slotted guide to hold the closure in uplifted position, a lever arm pivoted on the front wall and pivoted to the brace rod, a vertically reciprocable trigger mounted on the front wall and resting on the platform, and a retaining lug on the front wall for co-action with the trigger.

4. In an animal imprisoning appliance, the combination with an open end trap having a bottom, front wall and back wall, a closure having a lid and end flanges and hinged in overbalanced position on the rear wall, and a tiltable plate form mounted on the bottom, of a bracket forming a slotted guide mounted at the hinged edge of the closure, a brace rod engaging the slotted guide, a lever arm pivoted on the front wall and pivoted to said rod, a vertically reciprocable and partially rotatable trigger mounted on the front wall and resting on the platform and an arm on the trigger, a lug on the front wall for retaining said arm in engagement with the lever arm, and means for locking the closure in closed position.

5. In an animal imprisoning and striking appliance the combination with a trap, an overbalanced hinged closure pivotally mounted on the trap, a tiltable platform mounted in the trap, a brace rod and release mechanism for the closure, a trigger mechanism between the brace rod and the tiltable platform, a second trigger mechanism operatively connected to the closure, a swinging, spring-actuated striking jaw mounted in the trap, and means actuated by the second trigger mechanism for releasing the striking jaw when the closure is released by the weight of the victim on said platform.

6. In an animal imprisoning and striking appliance, the combination with a trap, a hinged overbalanced closure pivotally mounted on the trap, a tiltable platform mounted in the trap, a brace rod and release mechanism for the closure, a trigger mechanism between the brace rod and the tiltable platform, a second pivoted trigger-lever mounted on the trap and a releasable link connecting said lever with the closure, a spring actuated striking jaw mounted in the trap and engaged by the uplifted closure, and releasable means connecting the second trigger lever with the striking jaw.

7. In an animal trap, the combination which comprises a base having upwardly extended walls at the sides, a trigger platform pivotally mounted on the base, a wire striking frame pivotally mounted on a side wall, a closure hinged to a wall at one side of the base having ends positioned to enclose an area between the said side walls of the base with the closure in the lower position, means retaining the closure in an upward position wherein the trap is open, means retaining the striking frame in a striking position adjacent the side wall upon which the closure is hinged, means releasing the closure whereby it drops into enclosing position upon the base as weight is applied to the trigger platform, and means releasing the said striking frame as the closure is released.

SAM LANZA.

REFERENCES CITED

The following references are of record in the file of this patent:

UNITED STATES PATENTS

| Number | Name | Date |
|---|---|---|
| 1,277,122 | Renner | Aug. 27, 1918 |
| 2,412,518 | Krelwitz | Dec. 10, 1948 |